(12) United States Patent
Lin et al.

(10) Patent No.: US 10,973,225 B2
(45) Date of Patent: Apr. 13, 2021

(54) VITRIFICATION FREEZING TREATMENT DEVICE FOR CELLS AND TREATMENT METHOD THEREOF

(71) Applicant: SHENZHEN VITAVITRO BIOTECH CO., LTD., Guangdong (CN)

(72) Inventors: Xiaozhen Lin, Guangdong (CN); Gabor Vajta, Guangdong (CN)

(73) Assignee: Shenzhen Vitavitro BiotechCo., Ltd, Shenzhen (CN)

( * ) Notice: Subject to any disclaimer, the term of this patent is extended or adjusted under 35 U.S.C. 154(b) by 281 days.

(21) Appl. No.: 15/574,487

(22) PCT Filed: Oct. 19, 2016

(86) PCT No.: PCT/CN2016/102546
§ 371 (c)(1),
(2) Date: Jan. 10, 2018

(87) PCT Pub. No.: WO2018/068339
PCT Pub. Date: Apr. 19, 2018

(65) Prior Publication Data
US 2019/0116785 A1    Apr. 25, 2019

(30) Foreign Application Priority Data
Oct. 13, 2016  (CN) .......................... 201610895123.5

(51) Int. Cl.
*A01N 1/02*        (2006.01)

(52) U.S. Cl.
CPC .......... *A01N 1/0252* (2013.01); *A01N 1/0242* (2013.01); *A01N 1/0257* (2013.01); *A01N 1/0278* (2013.01)

(58) Field of Classification Search
CPC .. A01N 1/0252; A01N 1/0242; A01N 1/0257; A01N 1/0278
See application file for complete search history.

(56) References Cited

U.S. PATENT DOCUMENTS 9,228,925 B2 *  1/2016  Kim ..................... A01N 1/0242

FOREIGN PATENT DOCUMENTS

CN          104396942 A   *   3/2015
CN          105132370 A   *  12/2015

* cited by examiner

*Primary Examiner* — Kara D Johnson
(74) *Attorney, Agent, or Firm* — Marguerite DelValle

(57) ABSTRACT

The invention discloses a vitrification freezing treatment device for cells. The vitrification freezing treatment device for cells includes a straw device, a pre-freezing device, a freezing unit, a driving device, a control unit and a carrying table used for carrying cell carriers, wherein the straw device is connected with the driving device in a driven mode, the driving device is in signal connection with the control unit, the straw device comprises straws used for obtaining cells in the cell carriers, the control unit is used for controlling the driving device to drive the straw device to obtain cells and to transfer the cells to the freezing unit, and the pre-freezing device is used for pre-freezing the straws when the straw device transfers the obtained cells to the freezing unit.

27 Claims, 4 Drawing Sheets

VITRIFICATION FREEZING TREATMENT DEVICE FOR CELLS AND TREATMENT METHOD THEREOF

CROSS-REFERENCE TO RELATED APPLICATION

This application is a 371 of international application of PCT application serial no. PCT/CN2016/102546, filed on Oct. 16, 2016, which claims the priority benefit of China application no. 201610895123.5, filed on Oct. 13, 2016. The entirety of each of the above-mentioned patent applications is hereby incorporated by reference herein and made a part of this specification.

BACKGROUND

Technical Field

The invention relates to the technical field of vitrification freezing treatment of cells, in particular to a vitrification freezing treatment device for cells and a treatment method thereof.

Description of Related Art

With the development of biotechnology and the ensuing requirements on the aspects of biomedicine, human-assisted reproduction, breed conservation and production in animal husbandry, and the like, the vitrification freezing treatment technique for cells has already become a truly feasible cell and biological tissue preservation method after having been developed for over 60 years. Cryopreservation of human egg cells is the biggest concern and has the broadest application prospect. The infertility rate in China has been increased to about 20% now from 3% in 1992, and the main medical solution to infertility is the test-tube baby technique. In 2009, 138 test-tube baby institutions have been established in all, and 356 technical institutions were approved to carry out human-assisted reproduction in China up to 2012, and 17 sperm banks were established. In only 3 years, the number of the institutions has increased by 100%, on average, appointments for test-tube baby operations need to be made half a year in advance in first-tier cities, and demands is severely exceed the supply. One main reason for the state is that the vitrification freezing treatment technique for cells is low in efficiency at present. At present, the technical process of vitrification freezing treatment of cells is operated manually, and the skill level of operators and the stability of daily operation of the operators have a direct influence on the thawing rate of frozen cells. Since the operation for vitrification freezing treatment is extremely fine, time consumed for training a qualified operator is extremely long, the material cost is extremely high, and consequentially, manual operation is high in time consumption and labor consumption and low in efficiency. In addition, vitrification freezing for cells mainly depends on liquid nitrogen, and certain risks can be caused by long-time manual operation related to liquid nitrogen.

SUMMARY

The invention aims to provide a vitrification freezing treatment device for cells, and the vitrification freezing treatment device for cells can achieve automatic operation and is high in treatment efficiency.

For achieving the above aim, the invention provides a vitrification freezing treatment device for cells, the treatment device comprises a straw device, a pre-freezing device, a freezing unit, a driving device, a control unit and a carrying table used for carrying cell carriers, wherein the straw device is connected with the driving device in a driven mode, the driving device is in signal connection with the control unit, the straw device comprises straws used for obtaining cells in the cell carriers, the control unit is used for controlling the driving device to drive the straw device to obtain cells and to transfer the cells to the freezing unit, and the pre-freezing device provides a freezing medium for the straws for pre-freezing the cells when the straw device transfers the obtained cells to the freezing unit.

Furthermore, the driving device comprises a first driving part and a second driving part, the first driving part reciprocates in a first direction, the second driving part reciprocates in a second direction, the first direction is perpendicular to the second direction, the carrying table and the freezing unit are both fixedly connected with the first driving part, and the straw device is fixedly connected with the second driving part.

Furthermore, the driving device further comprises a third driving part, the third driving part reciprocates in a third direction, the third driving part is slidably connected with the first driving part or the second driving part, and the third direction is perpendicular to the first direction and the second direction.

Furthermore, the straw device comprises the straws used for siphoning cells and straw clamps used for fixing the straws.

Furthermore, each straw clamp comprises a guide sleeve, an ejection rod and a straw used for siphoning cells, the straws are located in the guide sleeves and can move in the axial direction of the guide sleeves, and the ejection rods are located in the guide sleeves and can move in the axial direction of the guide sleeves; the ejection rods are located above the straws so as to eject the straws out of the guide sleeves under a preset condition.

Furthermore, the treatment device further comprises a position detection device used for detecting the positions of the straws, wherein the position detection device is in signal connection with the control unit and is used for transmitting position information of the straws to the control unit.

Furthermore, each straw clamp further comprises a mounting part, the mounting parts are fixedly connected with the guide sleeves and also fixedly connected with the second driving part, and the straw device is fixedly connected with the second driving part through the mounting parts.

Furthermore, the straw device further comprises a driving part used for driving the ejection rods to reciprocate, and the driving part is fixedly connected with the ejection rods and is in signal connection with the control unit.

Furthermore, the number of the straws is more than one, the number of the ejection rods is more than one, the number of the straws is the same as that of the ejection rods, and the driving part is in a flat plate shape and is fixedly connected with the top ends of the multiple ejection rods.

Furthermore, each straw clamp further comprises a mounting part, the mounting parts are fixedly connected with the guide sleeves and also fixedly connected with the second driving part, and the straw device is fixedly connected with the second driving part through the mounting parts.

Furthermore, the treatment device further comprises a mounting support, wherein the mounting support comprises guide rods, a fixing part is provided with slideways matched with the guide rods and slidably connected with the guide rods, and the second driving part drives the fixing part to move up and down along the guide rods.

Furthermore, the pre-freezing device comprises a liquid nitrogen storage unit, a liquid nitrogen gasification unit, a pumping unit, nozzles and a pipeline, wherein the liquid nitrogen gasification unit comprises a gasification cavity, the pumping unit is connected with the liquid nitrogen storage unit so as to pump liquid nitrogen in the liquid nitrogen storage unit into the gasification cavity through the pipeline, and the nozzles communicate with the gasification cavity; the control unit is in signal connection with the pumping unit and is used for controlling starting and stopping of the pumping unit; the straw device comprises the straws used for siphoning the cell carriers, and gasified liquid nitrogen produced through the liquid nitrogen gasification unit is sprayed onto the straws through the nozzles.

Furthermore, the pre-freezing device further comprises a switch valve arranged on the pipeline between the pumping unit and the gasification cavity, and the control unit is in signal connection with the switch valve and is used for controlling opening and closing of the switch valve.

Furthermore, the liquid nitrogen gasification unit further comprises a fixing part, and the fixing part is internally hollow, so that the gasification cavity is formed; the fixing part comprises a liquid inlet and an air outlet, the gasification cavity communicates with the pipeline through the liquid inlet, the nozzles are fixedly connected with the air outlet of the fixing part, the air outlet communicates with the gasification cavity through the air outlet, and the fixing part is fixedly connected with the second driving part.

Furthermore, the pre-freezing device further comprises heating parts, the heating parts surround the outer walls of the nozzles, and heaters are in signal connection with the control unit.

Furthermore, the pre-freezing device further comprises a freezing container used for containing a freezing medium, and the freezing container is fixedly connected with the first driving part.

Furthermore, the freezing unit comprises a freezing tank and casing tubes used for containing the straws, the casing tubes are placed in the freezing tank, the freezing medium is contained in the freezing tank, and the freezing tank is fixedly connected with the first driving part.

The number of the casing tubes is more than one, multiple casing tubes form a casing tube array, and the multiple casing tubes are fixed in the freezing tank through supports.

Furthermore, the freezing unit further comprises a sliding cover used for covering the freezing tank, and the sliding cover is arranged at the top of the freezing tank and can slide along the top of the freezing tank.

According to the treatment device of the invention, the control unit can control the driving device to drive the straw device to automatically obtain cells and to automatically transfer the obtained cells to the freezing unit for freezing treatment, in the transferring process, the pre-freezing device is controlled to automatically spray a freezing medium onto the straws for pre-freezing treatment, in this way, full-automatic operation is achieved, manual operation errors in the prior art are reduced, batched operation is facilitated, and the treatment efficiency is greatly improved; meanwhile, operators do not need to be in close contact with the freezing medium, and thus safety is improved.

The invention further provides a treatment method applying the vitrification freezing treatment device for cells, and the treatment method comprises the following steps that:

the driving device drives the straw device to obtain cells in the cell carriers;

the pre-freezing device sprays a freezing medium to the straws for pre-freezing the cells;

the driving device drives the straw device to transfer the cells to the freezing unit for freezing treatment.

Furthermore, in a first preset time after the straw device obtains the cells, the pre-freezing device is controlled to provide a freezing medium for the straws for pre-freezing the cells.

Furthermore, the pre-freezing device comprises nozzles, the freezing medium is liquid nitrogen, and the step that the pre-freezing device provides the freezing medium for the straws for pre-freezing the cells is spraying the liquid nitrogen onto the straws for pre-freezing treatment by the pre-freezing device.

Furthermore, the nozzles are heated when the pre-freezing device sprays the freezing medium onto the straws for pre-freezing treatment.

Furthermore, the pre-freezing device comprises a freezing container used for containing the freezing medium, and the step that the pre-freezing device provides the freezing medium for the straws for pre-freezing the cells is driving the straw device to enable the lower ends of the straws to be immersed in the freezing container by the driving device.

Furthermore, the treatment method further comprises obtaining position information of the straws in real time, the driving device is controlled to move according to the position information, and accordingly the movement positions of the straws are controlled.

Furthermore, the freezing unit comprises a freezing tank and casing tubes used for containing the straws, and the casing tubes are placed in the freezing tank; the straw device comprises the straws, and the process that the driving device drives the straw device to transfer the cells to the freezing unit further comprises the following steps that:

the driving device drives the straw device to insert the straws into the casing tubes;

the straw device releases the straws and leaves the straws in the casing tubes.

Furthermore, the treatment method further comprises the step that the casing tubes are taken out to be packaged after the straws stay in the casing tubes for a second preset time.

Furthermore, the treatment method further comprises the following step that the packaged casing tubes are placed in a freezing source so as to be cryogenically preserved According to the treatment method in the embodiment of the invention, automatic operation can be achieved, it can be ensured that all operation steps for vitrification freezing treatment of cells can be completed within the required time, and the stability and success rate of the cryopreservation and thawing work of the cells are not affected by human factors (the skill level, the physiological condition, the emotional condition and the like of the operators) and thus are effectively ensured.

DESCRIPTION OF THE MAIN ELEMENT SYMBOLS 12, first driving part; 14, second driving part; 22, straw; 24, ejection rod; 26, guide sleeve; 28, mounting part; 31, nozzle; 35, pipeline; 32, liquid nitrogen storage unit; 33, liquid nitrogen gasification unit; 332, gasification cavity; 334, fixing part; 36, switch valve; 37, heating part; 40, control unit; 52, carrying table; 54, mounting support; 542, guide rod; 56, supporting table; 62, freezing tank; 64, casing tube; 66, sliding cover; 70, cell carrier; 23, driving part; 30, freezing container.

A further description of the invention is given with specific embodiments and the accompanying drawings as follows.

DETAILED DESCRIPTION

A further description of the invention is given with the accompanying drawings and specific embodiments as follows so that those skilled in the field can better understand and implement the invention. However, the invention is not limited to the provided embodiments.

Figure 1:
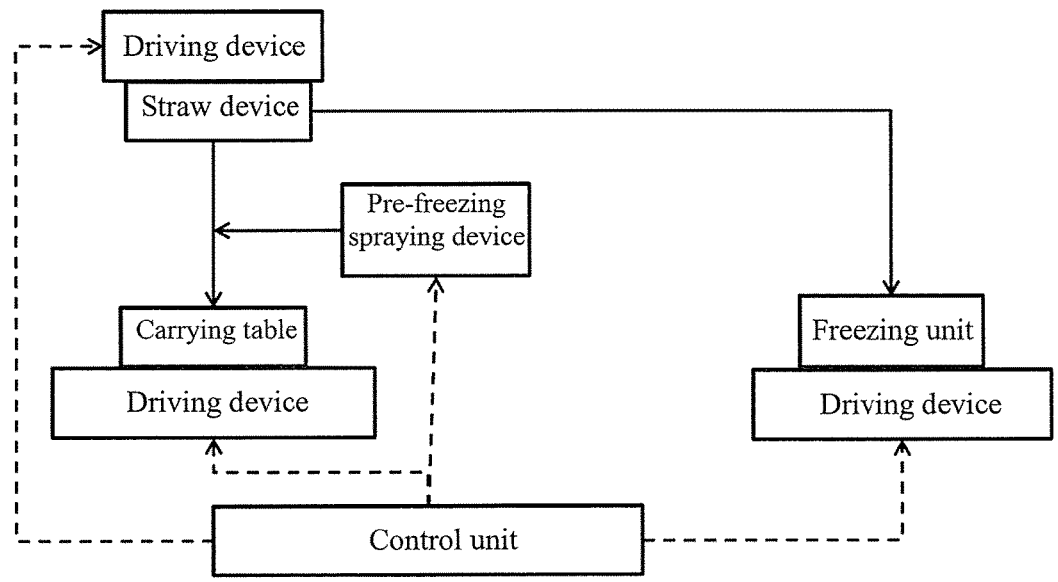
FIG. 1 is a frame diagram of a vitrification freezing treatment device for cells in one embodiment of the invention.
Figure 2:
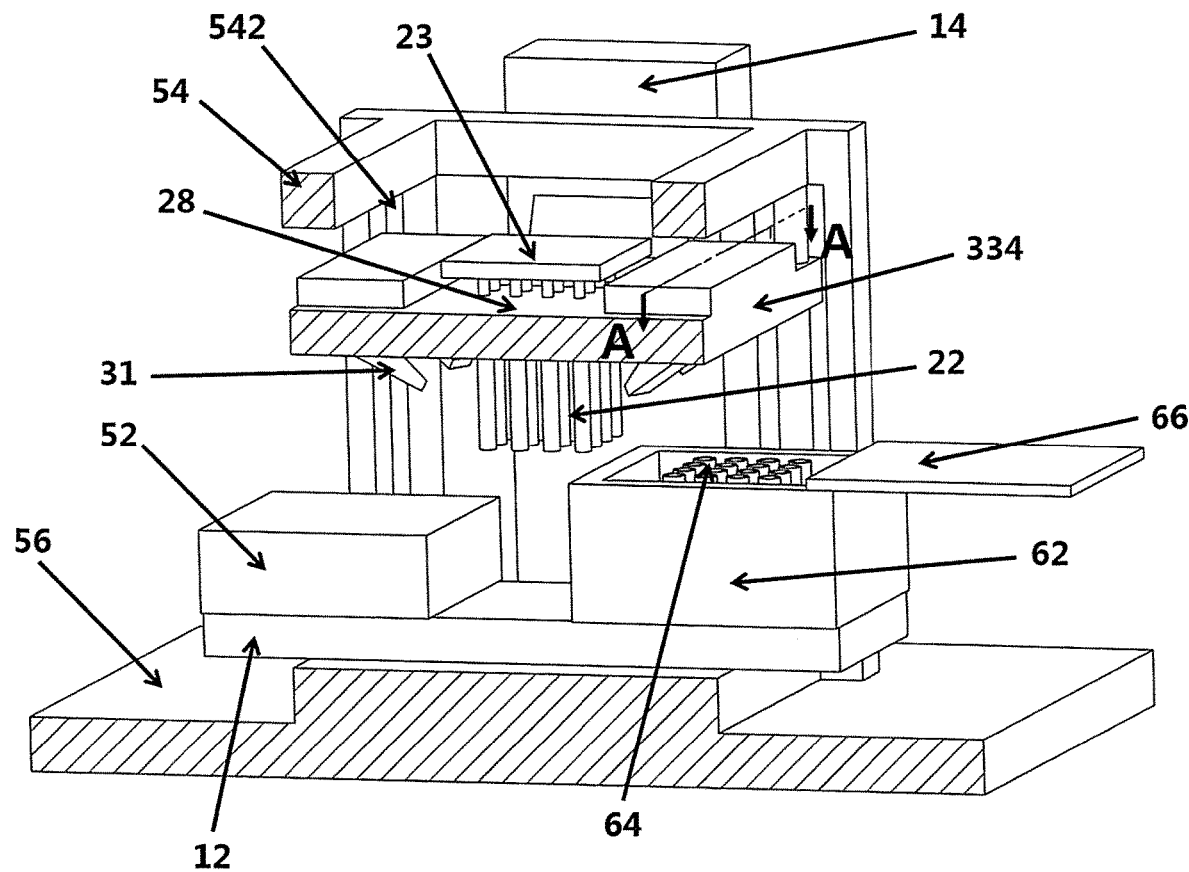
FIG. 2 is a structural diagram of the vitrification freezing treatment device for cells in one embodiment of the invention.

The embodiment of the invention provides a vitrification freezing treatment device for cells, please see FIG. 1 and FIG. 2, the treatment device comprises a straw device, a pre-freezing device, a freezing unit, a driving device, a control unit 40 and a carrying table 52 used for carrying cell carriers 70, wherein the straw device is connected with the driving device in a driven mode, the driving device is in signal connection with the control unit 40, the straw device comprises straws 22 used for obtaining cells in the cell carriers 70, the control unit 40 is used for controlling the driving device to drive the straw device to obtain cells and to transfer the cells to the freezing unit, and the pre-freezing device provides a freezing medium for the straws for pre-freezing the cells when the straw device transfers the obtained cells to the freezing unit. According to the treatment device of the invention, the control unit 40 can control the driving device to drive the straw device to automatically obtain cells and to automatically transfer the obtained cells to the freezing unit for freezing treatment, in the transferring process, the pre-freezing device automatically provides the freezing medium for the straws for pre-freezing treatment, in this way, full-automatic operation is achieved, manual operation errors in the prior art are reduced, batched operation is facilitated, and the vitrification freezing treatment efficiency is greatly improved; meanwhile, operators do not need to be in close contact with the freezing medium, and thus safety is improved.

The cell carriers 70 can be, but are not limited to, glass slides, liquid drops containing cells are dropped on the glass slides, and the glass slides are placed on the carrying table 52 before the treatment device is used.

The straw device comprises the straws 22 and straw clamps, the straws 22 are used for siphoning cells, and the straw clamps are used for fixing the straws 22. The straw clamps can fix the straws 22 in a clamping mode or an electrostatic adsorption mode or a pressure difference adsorption mode or through a magnetic field or an electromagnetic field. When the straws 22 need to be fixed (such as when cells are siphoned and transferred), the straw clamps fix the straws 22; when the straws 22 need to be released (such as after cells enter casing tubes of the treatment device), the straw clamps release the straws 22.

Figure 3:
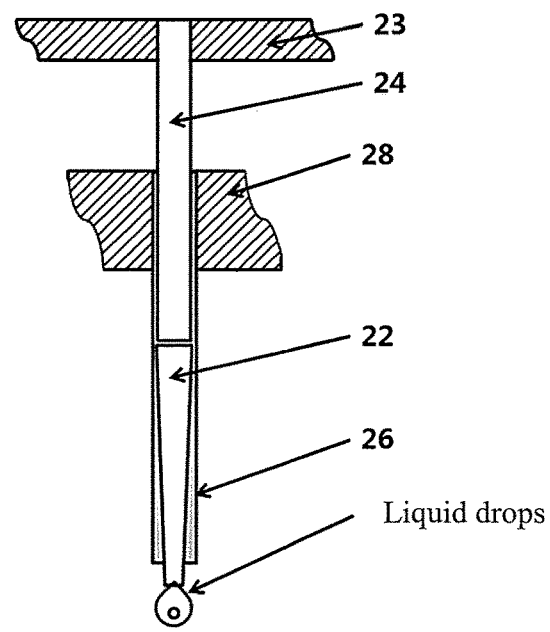
FIG. 3 is a structural diagram of a straw device in one embodiment of the invention.

Furthermore, please see FIG. 3, in the first embodiment of the invention, each straw clamp comprises a guide sleeve 26 and an ejection rod 24, the guide sleeves 26 are used for positioning the straws 22 and guiding movement of the straws 22, specifically, the straws 22 are located in the guide sleeves 26 and can move in the axial direction of the guide sleeves 26 (namely the length direction of the guide sleeves 26), and the ejection rods 24 are located in the guide sleeves 26 and can move in the axial direction of the guide sleeves 26; the ejection rods 24 are located above the straws 22 so as to eject the straws 22 out of the guide sleeves 26 under a preset condition. For example, when the straws 22 need to be placed in the freezing unit for freezing treatment (namely under the preset condition), the ejection rods 24 move downwards to eject the straws 22 out of the guide sleeves 26. The straws 22 are in clearance fit with the guide sleeves 26 so that the straws 22 can be kept at the required positions by means of proper friction force between the straws 22 and the inner walls of the guide sleeves 26 without other fixing devices. The straws 22 can be hoses, so that the hoses can be clamped into the guide sleeves 26 conveniently without damaging the guide sleeves 26, and of course, the straws 22 can also be hard tubes. Furthermore, each straw clamp further comprises a mounting part 28, the mounting parts 28 are fixedly connected with the guide sleeves 26 and also fixedly connected with the driving device, the straw device is fixedly connected with the driving device through the mounting parts 28, specifically, the mounting parts 28 are provided with mounting holes, and the guide sleeves 26 are fixedly embedded into the mounting holes. The shape of the mounting parts 28 is not limited, for example, please see FIG. 2, the mounting parts 28 can be, but are not limited to, a flat plate shape.

The number of the straws 22 is not limited and can be one or more, multiple straws 22 can form a straw array and can obtain cells in multiple cell carriers 70 at the same time, and thus the treatment efficiency of the treatment device is further improved.

The straws 22 can siphon cells in various ways without being limited, for example, the straws 22 can siphon cells through, but are not limited to, capillary force or a pressure difference.

For driving the ejection rods 24 conveniently, the straw device further comprises a driving part 23, and the driving part 23 is fixedly connected with the ejection rods 24, is in signal connection with the control unit, and is used for driving the ejection rods 24 to reciprocate in the axial direction of the guide sleeve 26; what needs to be pointed out is that an oil cylinder, an air cylinder or other electrical elements can serve as the driving source of the driving part 23, and the driving source is not shown in FIG. 2. The straws 22 are in one-to-one correspondence with the ejection rods 24 and the guide sleeves 26, for further improving the treatment efficiency of the straw device, the number of the straws 22 is more than one, the number of the ejection rods 24 is more than one, the number of the guide sleeves 26 is more than one, and the number of the ejection rods 24 and the number of the guide sleeves 26 are in one-to-one correspondence with the number of the straws 22; a straw array is formed by multiple straws 22 so that the straw device can siphon various cells or a large number of cells every time, and the treatment efficiency is greatly improved. Furthermore, the driving part 23 is in a flat plate shape and is fixedly connected with the top ends of the multiple ejection rods 24, and the driving part 23 can rise and fall to drive the multiple ejection rods 24 to rise and fall synchronously.

Please see FIG. 2 again, the driving device comprises a first driving part 12 and a second driving part 14, the first driving part 12 reciprocates in a first direction (the left-right direction of FIG. 2), and the first direction is the horizontal direction in the embodiment; the second driving part 14 reciprocates in a second direction (the up-down direction of FIG. 2), the second direction is the vertical direction in the embodiment, and the first direction is perpendicular to the second direction; the carrying table 52 and the freezing unit are both fixedly connected with the first driving part 12 and driven by the first driving part 12 to horizontally move synchronously along with the first driving part 12, and the straw device is fixedly connected with the second driving part 14 through the mounting parts 28 and driven by the second driving part 14 to vertically move synchronously along with the second driving part 14.

What needs to be pointed out is that the first driving part 12 generally refers to driving components which can drive the carrying table 52 and the freezing unit to reciprocate in the first direction, and thus the first driving part 12 does not particularly refer to an independent driving component and can also be an assembly of a plurality of driving components. For example, in the first direction, the carrying table 52 can be connected with one driving component, the freezing unit can be connected with another driving component, and under this circumstance the driving component used for driving the carrying table 52 and the driving component used for driving the freezing unit are called the first driving part 12.

Please see FIG. 2, the freezing unit comprises a freezing tank 62 and casing tubes 64 used for containing the straws 22, and the casing tubes 64 are placed in the freezing tank 62. The casing tubes 64 can be fixed in the freezing tank 62 through supports, what needs to be noted is that 'fix' means that the casing tubes cannot move relative to the freezing tank, and the casing tube 64 can be taken out of the freezing tank 62 when necessary. A freezing medium is contained in the freezing tank 62, the type of the freezing medium is not limited, and any freezing medium which can create an ultralow-temperature (equal to or lower than −196° C.) environment is available. In the embodiment, the freezing medium is liquid nitrogen. The number of the casing tubes 64 can be set according to actual requirements, for example, multiple casing tubes 64 can be arranged to form a casing tube array, so that the treatment capacity of the device is further improved, and accordingly the treatment efficiency is improved. Furthermore, the freezing unit further comprises a sliding cover 66, and the sliding cover 66 is arranged at the top of the freezing tank 62 and can slide along the top of the freezing tank 62.

When the treatment device in the embodiment is operated, the cell carriers 70 are placed on the carrying table 52 first, the second driving part 14 drives the straw device to move to a preset position above the cell carriers 70 in the second direction (below FIG. 2), and the straws 22 can right siphon cells in the cell carriers 70 when the straw device is located at the preset position; the second driving part 14 drives the straw device to move upwards to a certain altitude, and in a first preset time after the cells are siphoned by the straws 22, the pre-freezing device provides a freezing medium for the straws 22 for pre-freezing the cells; then the first driving part 12 moves in the first direction (the left side of FIG. 2) to drive the freezing unit to move to a position under the straw device, the second driving part 14 drives the straw device to move downwards to the freezing unit, the driving part 23 drives the ejection rods 24 to eject the straws 22 out of the guide sleeves 26 and to eject the straws 22 into the casing tubes 64 of the freezing unit. The casing tubes 64 are taken out to be packaged after staying in the freezing tank 62 for a second preset time, and then the packaged casing tubes 64 are placed in a freezing source such as a liquid nitrogen tank so as to be cryogenically preserved for a long time.

For accurately positioning the up-down movement positions of the straw device, the treatment device further comprises a position detection device (not shown in the FIGs), and the position detection device is in signal connection with the control unit 40 so as to transmit position information of the straw device to the control unit 40. The position detection device can be mounted in any position where the position of the straw device can be smoothly detected without being limited. The type of the position detection device is not limited, for example, the position detection device can be, but is not limited to, an optoelectronic switch. When the precision of the optoelectronic switch is at least 0.05 mm, the positioning precision requirement can be met.

For conveniently guiding movement of the straw device, the treatment device further comprises a mounting support 54, the mounting support 54 comprises guide rods 542, and slideways matched with the guide rods 542 are arranged on the mounting parts 28. The mounting parts 28 are slidably connected with the guide rods 542, the second driving part 14 drives the mounting parts 28 to move up and down along the guide rods 542. In the embodiment, the slideways are through holes formed in the mounting parts 28, and the guide rods 542 penetrate through the through holes. Furthermore, the number of the guide rods is more than one, the multiple guide rods are distributed on the edges of the mounting parts 28, and thus a better guiding effect can be achieved.

Of course, the treatment device further comprises a supporting table 56, the first driving part 12 and the second driving part 14 are slidably mounted on the supporting table 56, and the mounting support 54 is fixedly mounted on the supporting table 56.

Furthermore, the driving device further comprises a third driving part (not shown in the FIGs), the third driving part reciprocates in a third direction (the direction perpendicular to the paper surface in FIG. 2), the third driving part is slidably connected with the first driving part 12 or the second driving part 14, and the third direction is perpendicular to the first direction and the second direction. Through cooperative movement of the first driving part 12, the second driving part 14 and the third driving part, the requirement for position alignment between the straw device and the cell carriers 70, as well as between the straw device and the freezing unit, can be met.

What needs to be pointed out is that electric-control driving or hydraulic driving or pneumatic-control driving can be adopted by the first driving part 12, the second driving part 14, and the third driving part.

Figure 4:
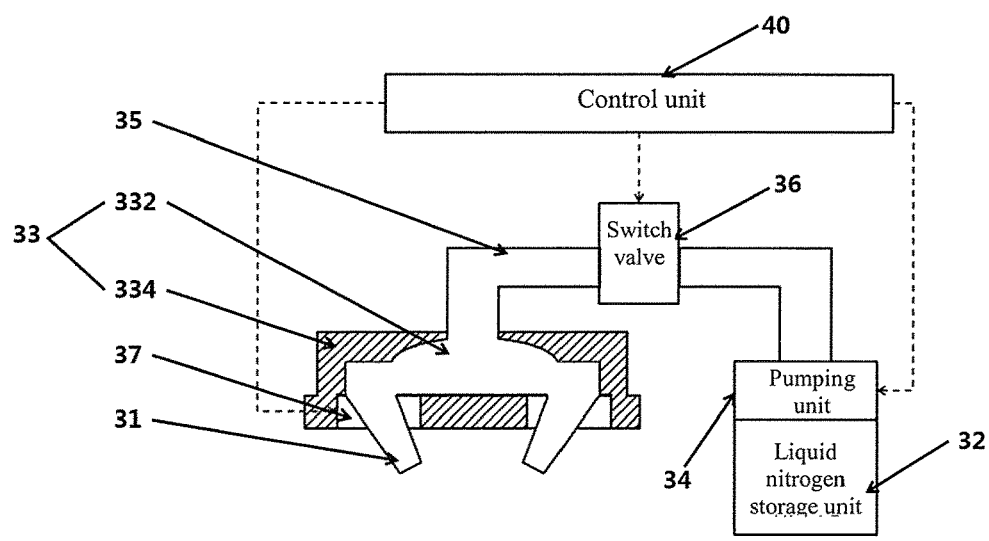
FIG. 4 is a structural diagram of a pre-freezing device in one embodiment of the invention.
Figure 5:
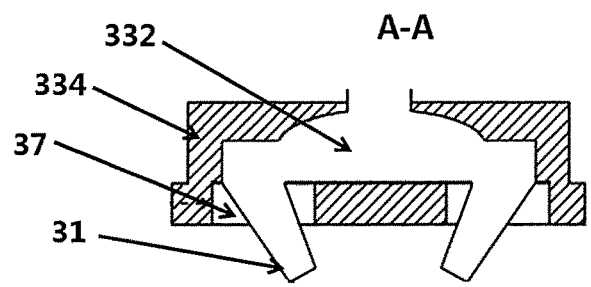
FIG. 5 is a sectional view in the A-A direction of FIG. 2.

Please see FIG. 4 and FIG. 5, in the first embodiment of the invention, the pre-freezing device comprises a liquid nitrogen storage unit 32, a liquid nitrogen gasification unit 33, a pumping unit, nozzles 31 and a pipeline 35, wherein the liquid nitrogen gasification unit 33 comprises a gasification cavity 332, the pumping unit is connected with the liquid nitrogen storage unit 32 so as to pump liquid nitrogen in the liquid nitrogen storage unit 32 into the gasification cavity 332, the nozzles 31 communicate with the gasification cavity 332, and the control unit is in signal connection with the pumping unit and is used for controlling starting and stopping of the pumping unit; the straw device comprises the straws used for siphoning cells in the cell carriers, and gasified liquid nitrogen produced through the liquid nitrogen gasification unit is sprayed onto the straws through the nozzles. The control unit 40 and the pre-freezing device further comprise a switch valve 36 which is arranged on the pipeline 35 between the pumping unit and the gasification cavity 332, and the control unit 40 is in signal connection with the switch valve 36 and is used for controlling opening and closing of the switch valve 36. The control unit 40 controls the switch valve 36 to be opened after detecting that the liquid nitrogen pumped out by the pumping unit reaches a certain pressure, so that the liquid nitrogen is gasified in the gasification cavity 332 under temperature rise conditions and sprayed out through the nozzles 31 for pre-freezing the cells.

The type of the switch valve 36 is not limited, however, since the temperature of liquid nitrogen is extremely low, the switch valve 36 needs to have the capacity to bear low temperatures and operate normally under low-temperature conditions, for example, the switch valve 36 can be, but is not limited to, a low-temperature electromagnetic valve, and the low-temperature electromagnetic valve is electrically connected with the control unit 40; when the pressure of liquid nitrogen in the pipeline 35 reaches a preset value, the control unit 40 controls the low-temperature electromagnetic valve to be powered and then to open, and the liquid nitrogen in the pipeline 35 enters the gasification cavity 332 after passing through the low-temperature electromagnetic valve and part of the pipeline 35. Of course, it is also available that the control unit 40 controls the low-temperature electromagnetic valve to open after controlling the pumping unit to pump for a preset time, namely the low-temperature electromagnetic valve is opened after the pumping unit is started for a preset time. According to the invention, the spraying-out speed, temperature, and duration of the liquid nitrogen can be controlled by regulating and controlling the pressure of the pumping unit and the on-off time of the low-temperature electromagnetic valve.

The structure and type of the pumping unit are not limited, and any pumping unit which can pump out liquid nitrogen is available, for example, the pumping unit is a booster in the embodiment.

The liquid nitrogen gasification unit 33 further comprises a fixing part 334, and the fixing part 334 is used for funning the gasification cavity 332, specifically, please see FIG. 4, the fixing part 334 is internally hollow, so that the gasification cavity 332 is formed; a first through hole is formed in the fixing part 334 and used as a liquid inlet, and a second through hole is formed in the fixing part 334 and used as an air outlet; the gasification cavity 332 communicates with the liquid inlet and communicates with the pipeline 35 through the liquid inlet, the gasification cavity 332 also communicates with the air outlet, and the nozzles 31 are fixedly connected with the fixing part 334 and communicate with the air outlet; the gasification cavity 332 communicates with the nozzles 31 through the air outlet, so that gasified nitrogen in the gasification cavity 332 is jet out. Furthermore, the fixing part 334 is fixedly connected with the second driving part 14 so that the second driving part 14 can synchronously drive the fixing part 334 and the nozzles 31 to synchronously move along with the second driving part 14 while driving the straw device to move vertically, it is ensured that the nozzles 31 and the straw device move synchronously, relative positions between the nozzles 31 and the straws 22 are kept unchanged, the accuracy of the spraying direction is ensured, and the treatment precision and treatment efficiency of the device are improved. On an actual using occasion, for pre-freezing the cells conveniently, the air outlet can be located at the top of the fixing part 334 and can also be located at the bottom of the fixing part 334.

For preventing the situation where the nozzles 31 are blocked due to condensation, caused by the extremely-low temperature of the nozzles 31, of moisture in the environment, a spraying device further comprises heating parts 37, the heating parts 37 surround the outer walls of the nozzles 31, and heaters are electrically connected with the control unit 40 so as to be controlled by the control unit 40 to heat the nozzles 31 at the proper time, and thus the nozzles 31 are prevented from being blocked.

For ensuring the pre-freezing effect and the reasonable structure of the device, two pre-freezing devices can be arranged, the two opposite sides of the straw device are each connected with one pre-freezing device, the two sides of the straw device can be the front side and the rear side of the straw device or the left side and the right side of the straw device, and in the embodiment, the two sides of the straws device refer to the left side and the right side of the straw device; the nozzles of the pre-freezing devices aim at the lower ends of the straws, the fixing part and the mounting parts can be of an integrated structure, or the fixing part and the mounting parts are separated and fixedly connected, in this way, the relative positions between the nozzles and the straws can be kept unchanged, the straw device and the pre-freezing devices can be fixedly connected with the second driving part only by fixedly connecting the mounting parts or the fixing part with the second driving part, and the second driving part can drive the straw device and the pre-freezing devices to move synchronously.

Figure 6:
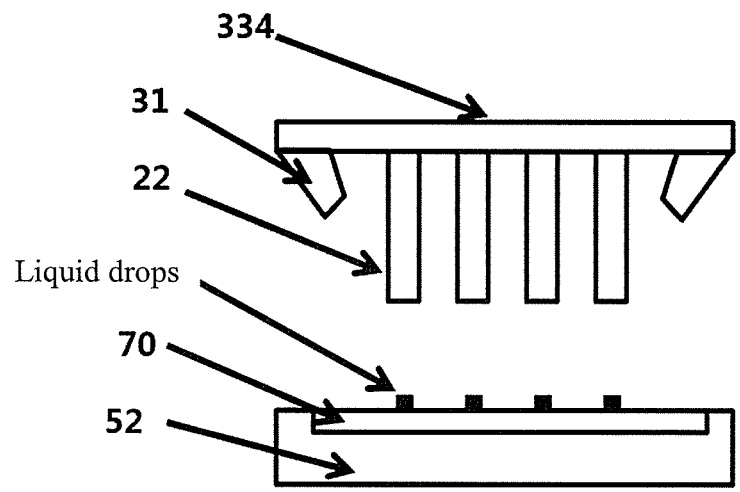
FIG. 6 is a diagram of the cell siphoning process in one embodiment of the invention.
Figure 7:
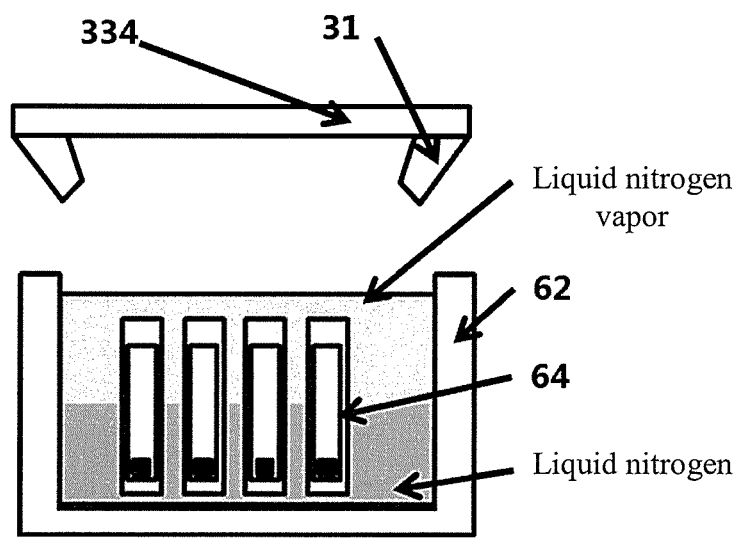
FIG. 7 is a diagram of the cell pre-freezing process in one embodiment of the invention.
Figure 8:
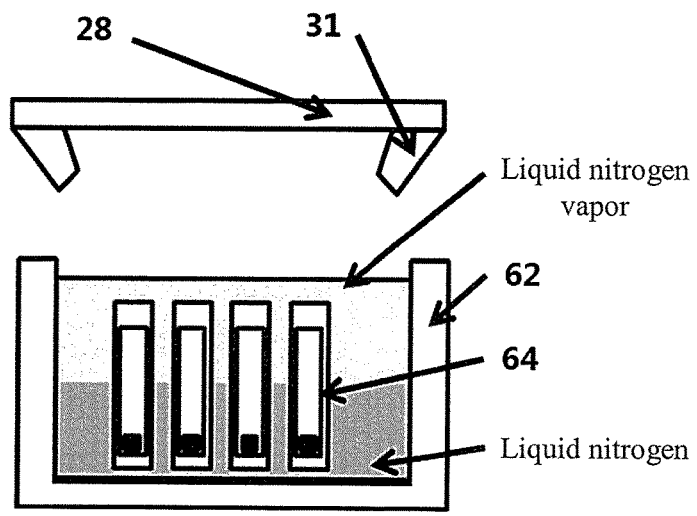
FIG. 8 is a diagram of the cell transferring and straw sleeving process in one embodiment of the invention.

The operating process of the treatment device in the first embodiment of the invention is as follows:

the cell carriers 70 (such as chips) loaded with cells are placed on the carrying table 52, of course, in order to standardize the operating process, fixing clamp positions for arraying the fluid cell carriers 70 exist on the carrying table 52, the cell carriers 70 are fixed to the fixing clamp positions, the device starts to operate after the straws 22 and the casing tubes 64 are mounted manually, and the operating process is as follows:

1. for the cell siphoning process, please see FIG. 6 (in FIG. 6, the straws 22 are about to siphon cells): the control unit 40 controls the first driving part 12 to drive the carrying table 52 to move to a first preset position, the first preset position is preset by the control unit 40, the control unit 40 controls the second driving part 14 to drive the straw device to move downwards to a second preset position, the second preset position is preset by the control unit 40, and through real-time feedback by the position detection device, the straws 22 can right siphon liquid drops (containing cells);

2. for the cell pre-freezing process, please see FIG. 7 (in FIG. 7, the pre-freezing device has already sprayed liquid nitrogen onto the straws 22): the control unit 40 controls the second driving part 14 to drive the straw device to move upwards, and in a first preset time (such as 10 seconds) after the liquid drops are siphoned, the control device 40 controls the pre-freezing device to spray liquid nitrogen onto the lower ends of the straws 22 for several seconds; the first preset time is preset by the control unit 40;

3. for the cell transferring and straw sleeving process, please see FIG. 8 (in FIG. 8, the straws 22 have already been placed in the casing tubes 64): the control unit 40 controls the first driving part 12 to drive the freezing unit to move leftwards to a third preset position, the sliding cover 66 of the freezing tank 62 is opened, the second driving part 14 drives the straw device to descend so that the straws 22 can aim at the casing tubes 64, the driving part 23 drives the ejection rods 24 to eject the straws 22 out of the guide sleeves 26 and to eject the straws 22 into the casing tubes 64, and the straw device (except the straws 22) moves upwards;

4. the first driving part 12 moves rightwards, the casing tubes 64 are taken out to be packaged (the casing tube preservation and packaging process) after the straws 22 stay in the casing tubes 64 for a preset time (such as 60 seconds), and then the packaged casing tubes 64 are placed in a liquid nitrogen tank or other freezing source so as to be cryogenically preserved for a long time.

Figure 9:
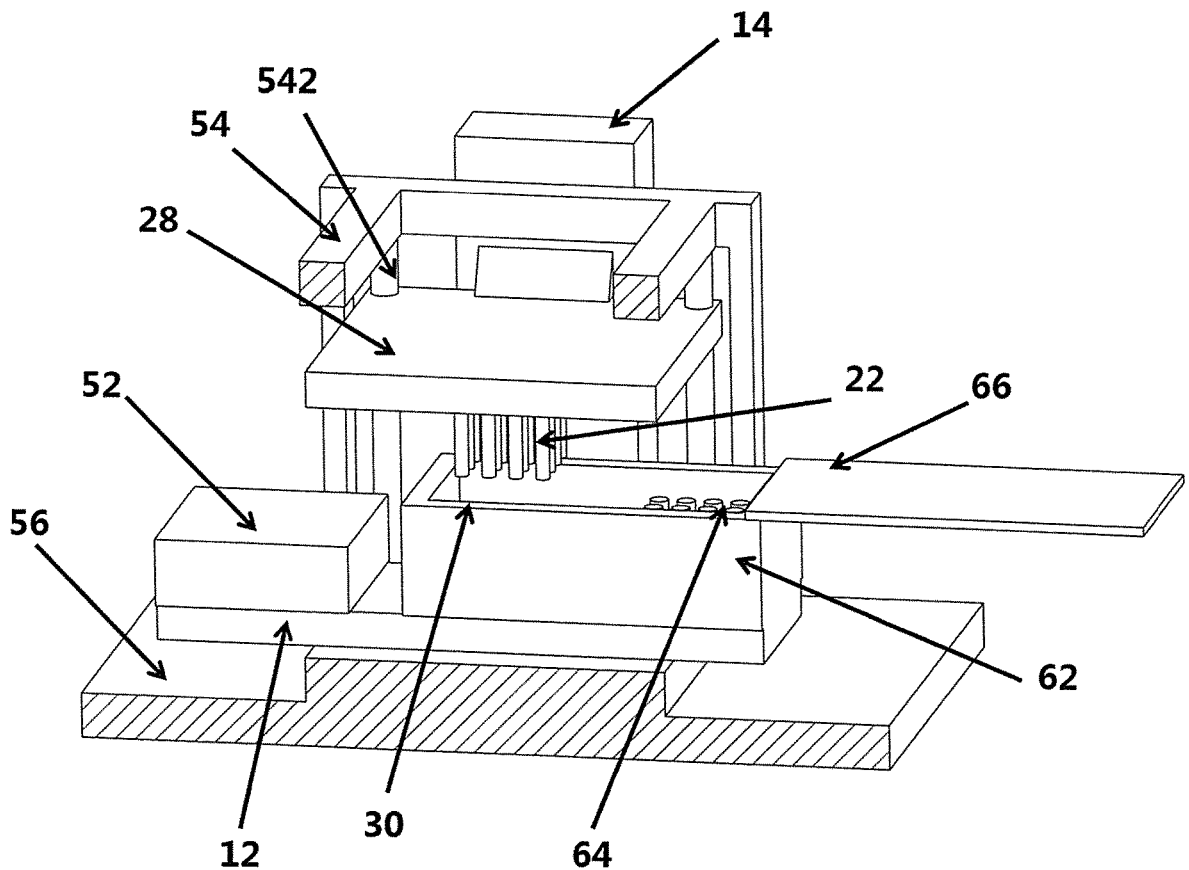
FIG. 9 is a structural diagram of a vitrification freezing treatment device for cells in another embodiment of the invention, wherein, the structure of the straw device is simplified.

Please see FIG. 9, in the second embodiment of the invention, the pre-freezing device comprises a freezing container 30 used for containing a freezing medium, and the freezing container 30 is fixedly connected with the second driving part. After the straw device siphons the cells, the first driving part 12 drives the freezing container 30 to move to a position below the straws 22, and the second driving part 14 drives the straw device to move downwards, so that the ends of the straws 22 containing the cells are immersed into the freezing medium in the freezing container 30 and the cells are pre-frozen; after the cells are pre-frozen for a preset time, the second driving part 14 drives the straw device to move upwards so that the straws 22 can be taken out of the freezing container 30. Of course, for further simplifying the structure, the freezing container 30 and the freezing tank can be the same one and share the same freezing medium such as liquid nitrogen.

According to the treatment device of the invention, full-automatic operation is achieved, and the treatment device can replace manual work to achieve high-efficiency and high throughput, automatic treatment for cell siphoning, cell transferring, cell pre-freezing treatment and casing tube preservation and packaging in the vitrification freezing process. Meanwhile, a standard treatment process can be established easily, the cryopreservation and recovery survival rate of cells is increased and stabilized, and increasing huge industrial demands are met.

Another embodiment of the invention further provides a treatment method applied to any treatment device mentioned above, and the treatment method comprises the following steps of:

a cell siphoning process, specifically, the driving device drives the straw unit to obtain cells in the cell carriers 70;

a cell pre-freezing process, specifically, the pre-freezing device provides a freezing medium for the straws 22 for pre-freezing the cells;

a cell transferring process, specifically, the driving device drives the straw unit to deliver the cells to the casing tube freezing unit for freezing treatment.

Of course, before the treatment method of the embodiment is performed, the cell carriers 70 need to be placed on the carrying table 52, and then the automatic treatment process is started.

According to the vitrification freezing treatment requirement in the prior art, cells need to be cooled rapidly after being siphoned and also need to be placed in casing tubes to be frozen within the required time; however, in the prior art, since all operation steps are completed manually, the time requirement mentioned above can hardly be met, and the skill level of operators and the stability of daily operation of the operators have a direct influence on the thawing rate of frozen cells. By adoption of the treatment method in the embodiment of the invention, automatic operation can be achieved, it can be ensured that all operation steps for vitrification freezing treatment of cells can be completed within the required time, and the stability and success rate of cryopreservation and thawing work of cells are not affected by human factors (the skill level, the physiological condition, the emotional condition and the like of the operators) and thus are effectively ensured.

Furthermore, in the first preset time after the straw unit obtains the cells, the pre-freezing device provides a freezing medium for the straws 22 for pre-freezing the cells. The first preset time is the limit freezing time for the cells after the cells are siphoned, for example, if the cells need to be pre-frozen within 10 seconds after being siphoned, the first preset time is 10 seconds. The first preset time can be preset in the control unit 40, the control unit 40 controls the operation time automatically, and thus both operation consistency and operation time consistency can be ensured.

The freezing temperature required for vitrification freezing of the cells is extremely low, and quick freezing is required. The freezing medium is not limited, and any freezing medium capable of achieving quick freezing is available, for example, in the embodiment, the freezing medium is liquid nitrogen.

The pre-freezing device comprises nozzles, the freezing medium is liquid nitrogen, and the step that the pre-freezing device provides the freezing medium for the straws for pre-freezing the cells refers to that the pre-freezing device sprays the liquid nitrogen onto the straws for pre-freezing the cells. For preventing the situation that the nozzles are blocked due to condensation, caused by extremely-low temperature of the nozzles 31, of moisture in the environment, the nozzles 31 are heated when the pre-freezing device provides the freezing medium for the straws 22 for pre-freezing treatment.

The lower ends of the straws 22 are used for siphoning cells, and for accurately positioning the movement position of the straw device, the control unit 40 obtains position information of the straws 22 in real time, controls the driving device to move according to the position information and then controls the movement positions of the straws 22. The position detection device can be mounted at any position where the position of the straw device can be smoothly detected without being limited. The type of the position detection device is not limited, for example, the position detection device can be, but is not limited to, an optoelectronic switch, and when the precision of the optoelectronic switch is at least 0.05 mm, the positioning precision requirement can be met.

Furthermore, the process that the control unit 40 controls the driving device to drive the straw unit to deliver the cells to the freezing unit for freezing treatment comprises the following steps that:

the control unit 40 controls the driving device to drive the straw unit to insert the straws 22 into the casing tubes 64;

the control unit 40 controls the straw device to release the straws 22 and to leave the straws 22 in the casing tubes 64.

The straws 22 are used for siphoning the cell carriers 70, the cell carriers 70 can be liquid drops, the casing tubes 64 are used for packaging the straws 22, quick freezing is also required when the straws 22 are placed into the casing tubes 64, the casing tubes 64 need to be packaged within the required time after quick freezing, and thus the treatment method further comprises the step that the casing tubes 64 are taken out to be packaged after the straws 22 stay in the casing tubes 64 for a second preset time. The second preset time is the shortest time for quick freezing of the straws 22 in the casing tubes 64, for example, if it is required that the casing tubes 64 can be taken out after the straws stay in the casing tubes for at least 60 seconds, the second preset time is 60 seconds.

Since the casing tube freezing unit cannot freeze the cells for a long time, the casing tubes 64 containing the cells need to be transferred into a freezing source to be cryogenically preserved for a long time, and thus the treatment method further comprises the step that the packaged casing tubes 64 are placed in a freezing source for long-time freezing. The packaged casing tubes can be preserved for tens of years in the freezing source (such as liquid nitrogen).

The treatment method in the embodiment of the invention can achieve high-efficiency and high throughput, automatic treatment for cell siphoning, cell transferring, cell pre-freezing treatment and casing tube preservation and packaging in the vitrification freezing process; meanwhile, a standard treatment process can be established easily, the cryopreservation and recovery survival rate of cells is increased and stabilized, and increasing huge industrial demands are met.

The above embodiments are only preferred embodiments provided for a full description of the invention, however, the protection scope of the invention is not limited to the above embodiments. Equivalent substitutes or changes which are made by those skilled in the field based on the invention are all within the protection scope of the invention. The protection scope of the invention is subject to the claims.

What is claimed is:

1. A vitrification freezing device for cells comprising:
a driving device,
a carrying table fixedly connected to the driving device,
a plurality of cell carriers attached to the carrying table wherein the cell carriers contain cells,
a freezing unit fixedly connected to the carrying table,
a straw device comprising a plurality of straws wherein the straw device is fixedly connected to the driving device,
a pre-freezing device, and
a control unit in signal connection with the driving device, straw device, and prefreezing device.

2. The device according to claim 1 wherein:
the driving device comprises a first driving part which reciprocates in a first direction and a second driving part which reciprocates in a second direction,
wherein the first direction is perpendicular to the second direction;
the carrying table and freezing unit are fixedly connected with the first driving part, and the straw device is fixedly connected with the second driving part.

3. The device according to claim 2 wherein the driving device further comprises a third driving part, the third driving part reciprocates in a third direction, the third driving part is slidably connected with the first driving part or the second driving part, and the third direction is perpendicular to the first direction and the second direction.

4. The device according to claim 2 wherein the straw device further comprises a plurality of straw clamps.

5. The device according to claim 4 wherein each straw clamp comprises a guide sleeve and a ejection rod, where the straws are located in the guide sleeves and are movable in an axial direction of the guide sleeves, the ejection rods are located in the guide sleeves and are movable in the axial direction of the guide sleeves, and whereby the ejection rods eject the straws from the guide sleeves under a preset condition.

6. The device according to claim 5 wherein the straw device further comprises a fourth driving part which is in signal connection with the control unit and is fixedly connected with the ejection rods.

7. The device according to claim 6 wherein a number of straws is more than one and is equal to that of a number of ejection rods, and the fourth driving part is in a flat plate shape and is fixedly connected with top ends of the ejection rods.

8. The device according to claim 5 wherein each straw clamp further comprises a mounting part, each mounting part is fixedly connected with one of the guide sleeves and also fixedly connected with the second driving part, and the straw device is fixedly connected with the second driving part through each mounting part.

9. The device according to claim 8 further comprising a mounting support comprising guide rods and a fixing part provided with channels through which the guide rods slide, wherein the second driving part drives the fixing part to move up and down along the guide rods.

10. The device according to claim 4 further comprising a straw position detection device, wherein the position detection device is in signal connection with the control unit and transmits position information of the straws to the control unit.

11. The device according to claim 2 wherein the pre-freezing device further comprises a freezing container fixedly connected with the first driving part.

12. The device according to claim 2 wherein the pre-freezing device further comprises a freezing tank fixedly connected to the first driving part, a freezing medium in the freezing tank, and sealers placed in the freezing tank.

13. The device according to claim 12 wherein a plurality of sealers form a sealer array and said array is fixed in the freezing tank with supports.

14. The device according to claim 12 further comprising a sliding cover positioned on the top of the freezing tank.

15. The device according to claim 1 wherein the pre-freezing device comprises:
a liquid nitrogen storage unit,
a liquid nitrogen gasification unit comprising a gasification cavity,
a pumping unit functionally connected to the storage unit and in signal connection with the control unit,
a pipeline connected to the pumping unit leading to the liquid gasification unit, one or more nozzles connected to and emerging from the gasification cavity which nozzles are pointed at the straws and through which gasified liquid nitrogen is sprayed.

16. The device according to claim 15 wherein the pre-freezing device further comprises a switch valve located on the pipeline between the pumping unit and the gasification cavity, and where the control unit is in signal connection with the switch valve.

17. The device according to claim 15 wherein the liquid nitrogen gasification unit further comprises a fixing part having a hollow portion forming the gasification cavity, the fixing part further comprises a liquid inlet which leads from the pipeline to the gasification cavity and at least one air outlet that leads from the gasification cavity to the nozzles, and where the fixing part is fixedly connected with the second driving part.

18. The device according to claim 15 wherein the pre-freezing device further comprises heating parts that surround outer walls of the nozzles, wherein the heating parts are in signal connection with the control unit.

19. A vitrification freezing treatment method comprising: providing a device, the device comprising a driving device, a carrying table fixedly connected to the driving device, a plurality of cell carriers attached to the carrying table wherein the cell carriers contain cells, a freezing unit fixedly connected to the carrying table, a straw device comprising a plurality of straws wherein the straw device is fixedly connected to the driving device, a pre-freezing device, and a control unit in signal connection with the driving device, straw device, and pre-freezing device; positioning a the carrying table in a receptive position to the straw device.

20. The treatment method according to claim 19 wherein the pre-freezing device applies a freezing medium in a first preset time after the straw device siphons the cells.

21. The treatment method according to claim 20 wherein the freezing medium is liquid nitrogen.

22. The treatment method according to claim 21 wherein the device further comprises heating nozzles which are positioned in the pre-freezing device.

23. The treatment method according to claim 20 further comprising driving the straw device to lower an end of each of the straws into a freezing container of the prefreezing device.

24. The treatment method according to claim 19 further comprising:

obtaining position information of the straws in real time, and controlling movement of the driving device according to the position information.

25. The treatment method according to claim 19 wherein the freezing unit further comprises a freezing tank and sealers, the method further comprising: placing sealers in the freezing tank;

driving the straw device to transfer the straws into the sealers; and releasing the straws held by the straw device and leaving the straws in the sealers.

26. The treatment method according to claim 25, further comprising taking the sealers out of the freezing tank and packaging the sealers containing the straws after a second preset time.

27. The treatment method according to claim 26, further comprising placing the packaged sealers in a freezing source and cryogenically preserving the packaged sealers.

* * * * *